(12) United States Patent
Horvath

(10) Patent No.: US 9,268,005 B2
(45) Date of Patent: Feb. 23, 2016

(54) IMAGE RECORDING SYSTEM WITH RELATIONAL TRACKING

(71) Applicant: Jon Patrik Horvath, San Francisco, CA (US)

(72) Inventor: Jon Patrik Horvath, San Francisco, CA (US)

(*) Notice: Subject to any disclaimer, the term of this patent is extended or adjusted under 35 U.S.C. 154(b) by 0 days.

(21) Appl. No.: 14/720,635

(22) Filed: May 22, 2015

(65) Prior Publication Data

US 2015/0338499 A1 Nov. 26, 2015

Related U.S. Application Data

(60) Provisional application No. 62/002,753, filed on May 23, 2014.

(51) Int. Cl.
*G01S 3/786* (2006.01)
*G01S 1/02* (2010.01)
*H04N 5/232* (2006.01)

(52) U.S. Cl.
CPC ............... *G01S 3/7864* (2013.01); *G01S 1/02* (2013.01); *H04N 5/232* (2013.01)

(58) Field of Classification Search
CPC . G05D 1/0255; G05D 1/0225; G05D 1/0242; G05D 1/0246; G05D 1/027; G05D 1/0272; G05D 1/0274; G05D 1/0234; G05D 1/021; G05D 1/0022; G05D 2201/0216; A61B 18/082; A61B 19/2203; A61B 19/5244; A61B 19/54; A61B 1/00004; A61B 1/00013; A61B 1/00045; A61B 1/00057; A61B 1/00165; A61B 1/0017; G06F 19/3418; G06F 19/3406; G06F 19/3462; G06F 15/173; G06F 3/013; G06F 3/017

USPC ............ 348/77, 148, 143, 169, 222.1, 46, 61; 382/154, 309; 600/117, 302, 424
See application file for complete search history.

(56) References Cited

U.S. PATENT DOCUMENTS

| 6,813,586 B1 | 11/2004 | Vock et al. |
| 7,009,561 B2 | 3/2006 | Menache et al. |
| 8,125,630 B2 | 2/2012 | Wood et al. |
| 8,165,844 B2 | 4/2012 | Luinge et al. |

(Continued)

FOREIGN PATENT DOCUMENTS

WO 2005024454 A2 3/2005

OTHER PUBLICATIONS

Oakley Airwave Goggles, Jan. 22, 2015, http://www.oakley.com/en/mens/goggles/snow-goggles/airwave/product/WGOO7049?variant=700285844398&fit=GLOBAL&lensShape=STANDARD&skuCode=59-448.

*Primary Examiner* — Behrooz Senfi
(74) *Attorney, Agent, or Firm* — Robert Crownover

(57) ABSTRACT

A relational tracking and recording method and apparatus can include: transmitting a signal from a beacon; detecting the signal with a first antenna and with a second antenna, the first antenna coupled to a tracking and recording element; determining a time of flight for the signal between the beacon and the first antenna; calculating a distance between the beacon and the first antenna based on the time of flight; determining a horizontal angle of the beacon; determining a vertical angle of the beacon; positioning an image sensor to face toward the beacon based on the vertical angle and based on the horizontal angle; focusing optics in front of the image sensor based on the distance; zooming the optics in front of the image sensor based on the distance; and recording an image with the image sensor.

20 Claims, 7 Drawing Sheets

(56) References Cited

U.S. PATENT DOCUMENTS

| | | |
|---|---|---|
| 2010/0110187 A1 | 5/2010 | von Flotow et al. |
| 2011/0074631 A1 | 3/2011 | Parker |
| 2012/0019665 A1 | 1/2012 | Toy |
| 2013/0182225 A1 | 7/2013 | Stout |
| 2013/0188067 A1 | 7/2013 | Koivukangas et al. |
| 2013/0229528 A1* | 9/2013 | Taylor .................. G01S 3/7864 348/169 |
| 2013/0336628 A1 | 12/2013 | Lamb et al. |
| 2014/0046589 A1 | 2/2014 | Metzler et al. |
| 2014/0098241 A1 | 4/2014 | Stout et al. |
| 2014/0111653 A1 | 4/2014 | Willemenot De Nanc |
| 2014/0140575 A1* | 5/2014 | Wolf .................... G06K 9/3233 382/103 |

* cited by examiner

IMAGE RECORDING SYSTEM WITH RELATIONAL TRACKING

CROSS-REFERENCE TO RELATED APPLICATIONS

This Application claims priority benefit to all common subject matter of U.S. Provisional Patent Application Ser. No. 62/002,753 filed May 23, 2014. The content of this application is incorporated herein by reference in its entirety.

TECHNICAL FIELD

This disclosure relates to recording devices, more particularly a recording device having automated relational tracking.

BACKGROUND

In recent times, the sports action camera market has expanded rapidly disrupting the digital imaging industry, which was largely focused on video, low end point and shoot, and SLR cameras. Point of view (POV) sports action cameras have taken significant share of this market becoming the principal means of recording action and adventure related sports.

With the expansion of the POV sports camera technology, many manufactures have begun to offer increasingly feature rich products. In order to compete in the POV sports camera market, products must be generally small, light, rugged, easy and fast to setup, mobile, highly integrated, feature rich, and provide exceptionally effective image capture.

As the number of videos and images captured with POV sports cameras has grown, consumers and producers have recognized a major limitation of POV sports cameras; first-person perspective becomes redundant and capturing second-person or third-person perspective is difficult or impractical without a dedicated camera operator. Prior developments have attempted to solve this problem in various ways yet have failed to provide a simple yet complete solution. Offering second-person or third-person perspective without a dedicated camera operator remains a considerable problem for the sports action camera market.

Most prior developments have attempted to solve the problem by using a stationary piece part solution to aim a separate, non-integrated video recording device at a subject. This line of development is prohibitively bulky, clumsy to use, slow to setup, and immobile.

Thus, solutions have been long sought but prior developments have not taught or suggested any complete solutions, and solutions to these problems have long eluded those skilled in the art. Thus, there remains a considerable need for devices and methods that can provide automated, integrated, and effective relational tracking, framing, and filming capabilities for the sports camera market.

SUMMARY

A relational tracking and recording system and methods, eliminating the need for a third-party operator, is disclosed. The relational tracking and recording method and apparatus can include: transmitting a signal from a beacon; detecting the signal with a first antenna and with a second antenna, the first antenna coupled to a tracking and recording element; determining a time of flight for the signal between the beacon and the first antenna; calculating a distance between the beacon and the first antenna based on the time of flight; determining a horizontal angle of the beacon relative to the tracking and recording element based on the detection of the signal by the first antenna and the second antenna; determining a vertical angle of the beacon relative to the tracking and recording element; positioning an image sensor to face toward the beacon based on the vertical angle and based on the horizontal angle; focusing optics in front of the image sensor based on the distance; zooming the optics in front of the image sensor based on the distance; and recording an image with the image sensor.

Embodiments of the image recording system can automate the sports video camera capture of moving objects and provide a second-person or third-person perspective. Embodiments of the image recording system can provide a highly integrated product combining the camera and optics while simultaneously automating zoom, focus, panning, and tilting.

Accordingly, it has been discovered that one or more embodiments described herein increase ease of use, automate tracking, zoom, and focus while recording all in a highly integrated system. Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The image recording system is illustrated in the figures of the accompanying drawings which are meant to be exemplary and not limiting; any reference to dimensions or features is to be understood as pertaining to exemplary embodiments and should not be construed as limiting except to the extent they are claimed, and in which:

DETAILED DESCRIPTION

Figure 1:
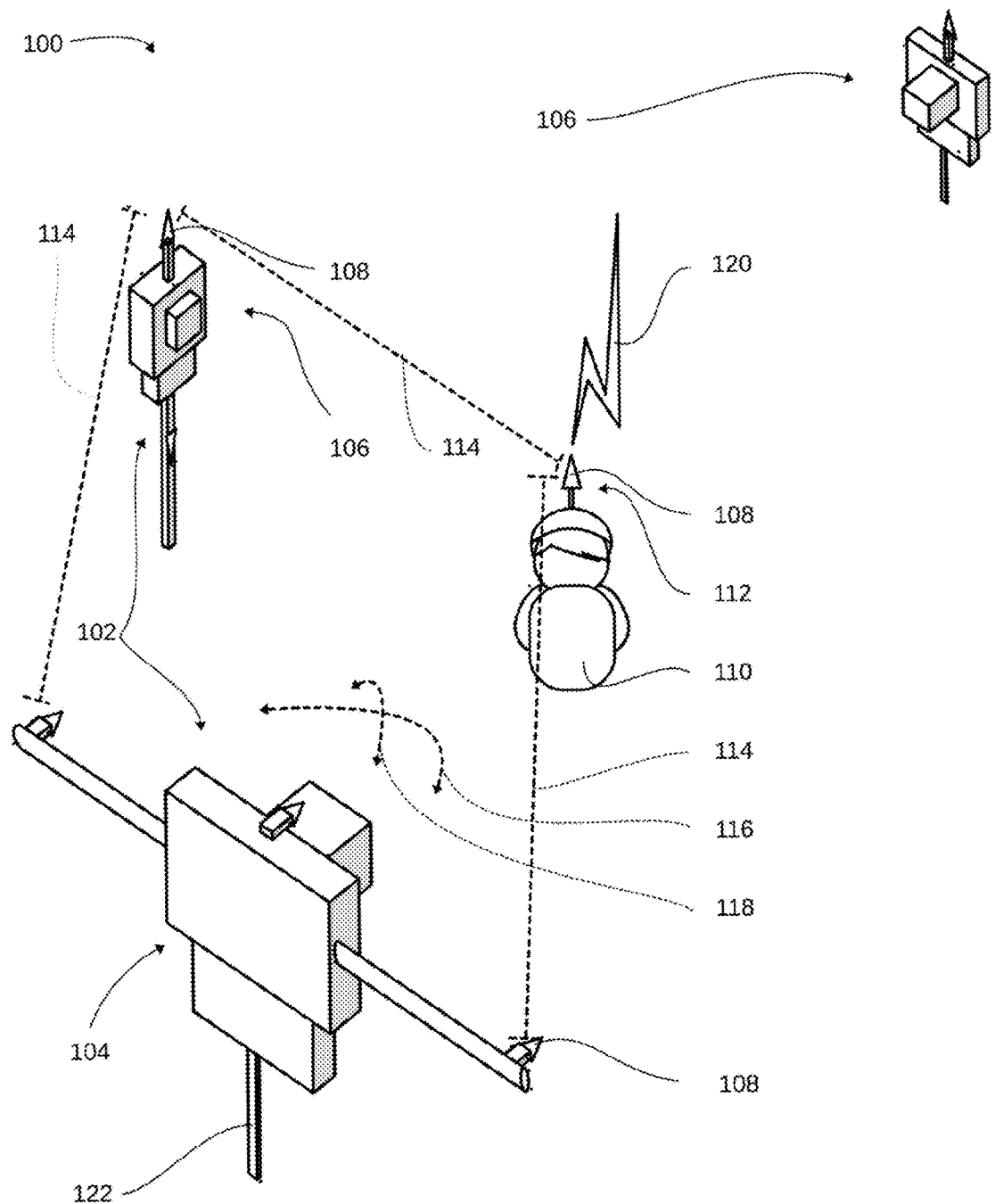
FIG. 1 is an illustrative overview of the image recording system.

In the following description, reference is made to the accompanying drawings that form a part hereof, and in which are shown by way of illustration, embodiments in which the image recording system may be practiced. It is to be understood that other embodiments may be utilized and structural changes may be made without departing from the scope of the image recording system.

The image recording system is described in sufficient detail to enable those skilled in the art to make and use the image recording system and provide numerous specific details to give a thorough understanding of the image recording system;

however, it will be apparent that the image recording system may be practiced without these specific details.

In order to avoid obscuring the image recording system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the image recording system can be operated in any orientation.

For expository purposes, the term "vertical" as used herein is defined as a plane parallel to the back plane or surface of the back plate, regardless of its orientation. The term "horizontal" refers to a direction perpendicular to the vertical as just defined. Terms, such as "above", "below", "bottom", "top", "side", "higher", "lower", "upper", "over", and "under", are defined with respect to the horizontal plane. The term "distal" and "proximal" should be understood in relation to the back plate that is a distal portion of a camera arm is further from the back plate than a proximal portion of the camera arm. The term "coupling" or "coupled" means a physical connection. The term "image" means still pictures or motion pictures.

Referring now to FIG. 1, therein is shown an illustrative overview of the image recording system 100. The image recording system 100 is depicted as having tracking and recording elements 102, such as a T-cam 104 and 360-cams 106.

The T-cam 104 is contemplated to be the tracking and recording elements 102 with antennas 108 spaced horizontally apart. The 360-cams 106 are the tracking and recording elements 102 with one or more antennas 108 that are not spaced horizontally apart.

The tracking and recording elements 102 are depicted pointing towards a user 110 wearing a beacon 112. The beacon 112 is shown having one of the antennas 108. It is contemplated that multiple users can be tracked and recorded by the tracking and recording elements 102 and that the tracking and recording elements 102 can be configured to track the user 110 that is the closest to the tracking and recording elements 102.

The tracking and recording elements 102 and the beacon 112 are shown having a distance 114 therebetween. For clarity of description, the distance 114 is measured between the antennas 108. Specifically, the distance 114 is to be understood as a physical space between antennas 108 on multiple tracking and recording elements 102 or between the tracking and recording elements 102 and the beacon 112.

The distance 114 between the beacon 112 and T-cam 104 can be the same or different from the distance 114 between the beacon 112 and the 360-cam 106. It is contemplated that the image recording system 100 can triangulate or trilaterate the location of the beacon 112 relative to the tracking and recording elements 102 and the tracking and recording elements 102 can be adjusted to track the beacon 112 and frame the user 110.

The tracking and recording elements 102 can be adjusted for a horizontal angle 116 and a vertical angle 118 as well as zoom and focus. The horizontal angle 116 is contemplated to be an angle along the horizontal plane while the vertical angle 118 can be an angle along a vertical plane. The horizontal angle 116 can correspond to a pan adjustment while the vertical angle 118 can correspond to a tilt adjustment.

It is contemplated that the image recording system 100 can track the beacon 112 and frame the user 110 with the T-cam 104 operating independently, with the T-cam 104 cooperating with one or more of the 360-cams 106, with the 360-cams 106 operating independently of the T-cam 104, with multiple T-cams 104 and multiple 360-cams 106, or some combination thereof. In each instance, the distance 114 between the tracking and recording elements 102 and the beacon 112 can be determined based on detecting a time of flight (TOF). That is, the length of time that a signal 120 takes to travel from the beacon 112 to the tracking and recording elements 102 can be used to calculate the distance between the beacon 112 and the tracking and recording elements 102.

The signal 120 from the beacon 112 can include a time stamp, which can be used to determine the TOF of the signal. The distance 114 between the tracking and recording elements 102 and the beacon 112 can be used to adjust the focus and zoom for the tracking and recording elements 102. The focus and zoom can be used to properly frame the user 110 and capture a focused image.

It is contemplated that the tracking and recording elements 102 can be configured to frame the user 110 differently. That is, for example, one of the tracking and recording elements 102 can be configured to fill an image frame entirely with the face of the user 110, while a different one of the tracking and recording elements 102 can be configured to frame the user 110 entirely within the center third of an image frame.

The tracking and recording elements 102 and the beacon 112 can each include an altimeter (as discussed below). The altimeters can be used to determine the difference in elevation between the tracking and recording elements 102 and the beacon 112.

It is contemplated that the difference in elevation between the tracking and recording elements 102 and the beacon 112 along with the distance 114 between the beacon 112 and tracking and recording elements 102 can be used to calculate the vertical angle 118 that the tracking and recording elements 102 are required to maintain in order to track the beacon 112. A further contemplated embodiment of the tracking and recording elements 102 can include an additional vertically offset antenna 108.

The vertically offset antenna 108 can be offset in the vertical plane from the other antennas 108 on either the T-cam 104 or the 360-cams 106. When implementing the vertically offset antenna 108, time difference of arrival (TDOA) can be used to calculate the vertical angle 118 that the tracking and recording elements 102 are required to maintain in order to track the beacon 112. The TDOA for the signal 120 from the beacon 112 to the antennas 108 and the vertically offset antenna 108 of the tracking and recording elements 102 can be the time difference between the arrival of the signal 120 at the antennas 108 and the arrival at the vertically offset antenna 108.

It is contemplated that the vertical angle 118 can also be calculated using TOF measurements to trilaterate the location of the beacon 112 in relation one of the antennas 108 on a single tracking and recording element 102 and in relation to a vertically offset antenna 108 on the same tracking and recording element 102. The TOF measurements can provide the distance 114 between the beacon 112 and two of the antennas 108 on the tracking and recording element 102 that are vertically spaced apart. Since the distance between the two antennas 108 vertically spaced apart on the same tracking and recording element 102 is known, these three distances 114 can be used to calculate the vertical angle 118.

In a similar manner, the T-cam 104 can independently determine the horizontal angle 116 of the beacon 112 by using the TDOA measurements for the antennas 108 of the T-cam 104. The TDOA for the T-cam 104 can be the difference in arrival time of the signal 120 between the antennas 108 of the T-cam 104. The difference in arrival time can be used to calculate the horizontal angle 116 that the T-cam 104 is required to maintain in order to track the beacon 112.

When implementing the image recording system 100 utilizing multiple tracking and recording elements 102, the horizontal angle 116 can be calculated using TOF measurements to trilaterate or triangulate the location of the beacon 112 in relation to the tracking and recording elements 102. The TOF measurements can provide the distance 114 between the beacon 112 and the tracking and recording elements 102. By combining the distances 114 between the beacon 112 and the tracking and recording elements 102 with the distance 114 between the tracking and recording elements 102 themselves, the horizontal angle 116 can be computed.

It is contemplated that the horizontal angle 116 can also be calculated using TOF measurements to trilaterate the location of the beacon 112 in relation to the antennas 108 on the T-cam 104. The TOF measurements can provide the distance 114 between the beacon 112 and two of the antennas 108 on the T-cam 104 that are horizontally spaced apart. Since the distance between the two antennas 108 on the T-cam 104 is known, these three distances 114 can be used to calculate the horizontal angle 116.

The distance 114 between the tracking and recording elements 102 themselves can be found using TOF measurement of the signal 120 between the tracking and recording elements 102 during an initialization sequence. It is further contemplated that the distance 114 between the tracking and recording elements 102 can be detected after an initialization sequence, such as for each location cycle, especially if the tracking and recording elements 102 are themselves moving.

The tracking and recording elements 102 are depicted with an anchor 122. The anchor 122 can be a fixed anchor such as a tripod, or wall mounting. It is further contemplated that the anchor 122 can be a moveable anchor such as a vehicle mount or a user mount. It is contemplated that the anchor 122 can incorporate the vertically offset antenna 108.

As an illustrative example, the T-cam 104 can be mounted in a fixed position. One of the 360-cams 106 can be mounted in a second fixed position, three or more meters away, with line of sight to the T-cam 104. The 360-cam 106 can provide a different vantage point of the user 110.

Upon initialization, the T-cam 104 and the 360-cam 106 can conduct a ranging transaction to determine the distance 114 between the T-cam 104 and the 360-cam 106. When the beacon 112 is introduced, a very large triangle can be created between the two tracking and recording elements 102 and the beacon 112.

It has been discovered that implementing multiple tracking and recording elements 102 at different locations enables the tracking and recording elements 102 to track the beacon 112 with much lower accuracy requirements because when trilaterating or triangulating the location of the beacon 112 relative to the tracking and recording elements 102, a much larger triangle can be used and the distance and angular measurements are less affected by error.

It is contemplated that the location coordinates of the beacon 112 can be computed in one of the tracking and recording elements 102 and sent to the other tracking and recording elements 102, which can use the location coordinates of the beacon 112 to adjust the horizontal angle 116, the vertical angle 118, the focus, and the zoom to track the beacon 112 and frame the user 110.

It is further contemplated that the location coordinates of the beacon 112 can be calculated distributively on multiple tracking and recording elements 102 and shared between the tracking and recording elements 102. In one contemplated method, the tracking and recording elements 102 can take turns performing TOF ranging transactions with the beacon 112 to determine the distance 114 therebetween.

The tracking and recording elements 102 can share the distances 114 between the tracking and recording elements 102 and between the tracking and recording elements 102 and the beacon 112 with each other wirelessly. Each of the tracking and recording elements 102 can then use the distances 114 from the beacon 112 to each of the tracking and recording elements 102 combined with the distance 114 between the tracking and recording elements 102 to calculate the location of the beacon 112 on the horizontal plane. The location of the beacon 112 can then be used by each of the two tracking and recording elements 102 to calculate the horizontal angle 116, focus and zoom to track the beacon 112 and frame the user 110.

It is also contemplated that the horizontal angle 116, the vertical angle 118, the focus and zoom can be computed in a single tracking and recording element 102 for each of the other tracking and recording elements and wirelessly sent to other tracking and recording elements 102. Alternatively it is contemplated that the tracking and recording elements 102 could perform calculations to determine the horizontal angle 116, the vertical angle 118, the focus, and the zoom in a distributive manner.

Figure 2:
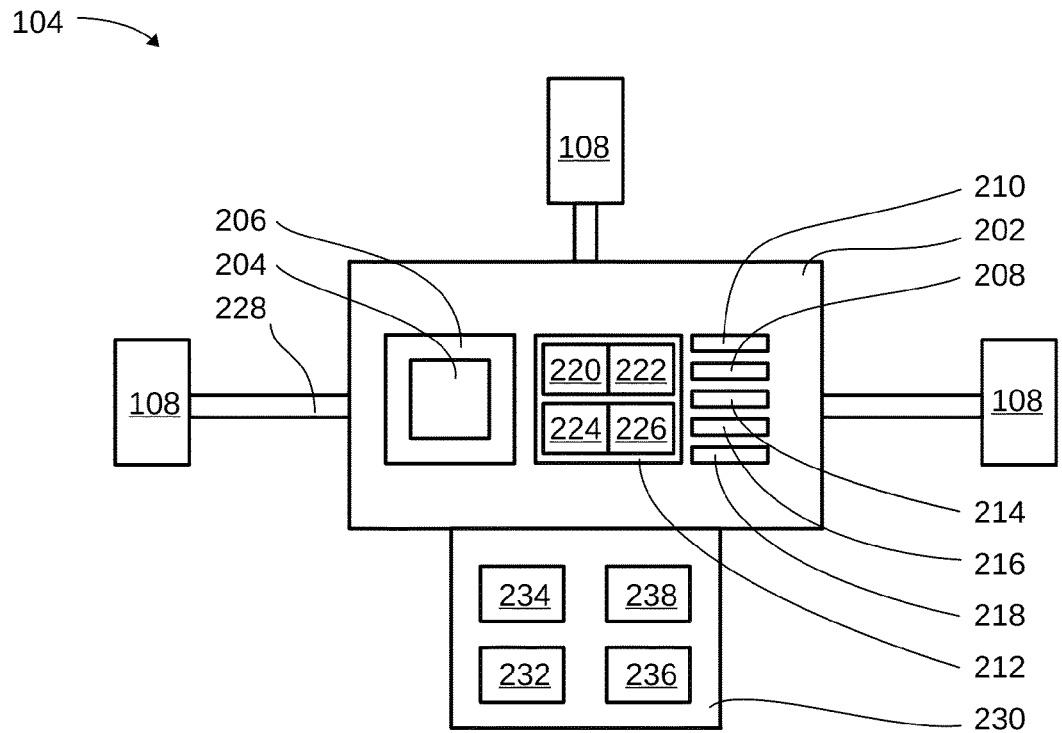
FIG. 2 is a block diagram of the T-cam of FIG. 1.

Referring now to FIG. 2, therein is shown a block diagram of the T-cam 104 of FIG. 1. The T-cam 104 is shown having the antennas 108 coupled to a component base 202.

The component base 202 can function as a chassis to mount and protect an image sensor 204, optics 206, a non-transitory computer readable medium 208, a microcontroller 210, a sensor suite 212, a user interface 214, and a communications module 216. It is contemplated that the microcontroller 210 and the non-transitory computer readable medium 208 can be integrated or separate.

The optics 206 can include lenses, apertures, shutters, and mirrors for capturing an image with the image sensor 204. The optics 206 can further include zoom and focus functions driven by a zoom and focus block 218 that includes motors and gearing.

The image sensor 204 can be coupled to the non-transitory computer readable medium 208 for storing the image. The sensor suite 212 can include a magnetometer 220, a gyroscope 222, an altimeter 224, and an accelerometer 226. It is contemplated that the magnetometer 220 and gyroscope 222 can be used to determine the direction the image sensor 204 is pointing, while the accelerometer 226 can detect acceleration of the T-cam 104.

The acceleration detection from the accelerometer 226 combined with the direction information from the magnetometer 220 and the gyroscope 222 can be combined to determine direction of travel. The altimeter 224 can be used to determine the elevation of the T-cam 104, and as described above can be used with an altimeter reading from the beacon 112 of FIG. 1 to determine the vertical separation between the beacon 112 and the T-cam 104 resulting in the vertical angle 118 of FIG. 1 required for the T-cam 104 to track the beacon 112.

The communications module 216 can enable wireless communication and wired communication. It is contemplated that the communications module 216 can be used to send and receive radio frequency signals in the ultra-high frequency (UHF) range or ultra wide band (UWB) range to determine the distance 114 of FIG. 1 from the beacon 112 and the other tracking and recording elements 102 of FIG. 1 for the image recording system 100 of FIG. 1.

The communications module 216 is further contemplated to enable communications between the T-cam 104 and the other tracking and recording elements 102, such as sending or receiving the location of the beacon 112, sending or receiving the altitude information for the beacon 112 or the other tracking and recording elements 102, and sending or receiving adjustments for the horizontal angle 116 of FIG. 1 or the vertical angle 118.

The communications module 216 is contemplated to communicate with the beacon 112 to transfer other information such as direction, acceleration, and audio that can be received by the communications module 216, attached to the image on the non-transitory computer readable medium 208, and synchronized with the time the information was collected by the beacon 112 and the time the image was captured by the image sensor 204.

It is contemplated that the communications module 216 can further include wireless and wired data transfer to an external storage unit such as a database or personal computer. The component base 202 can further include connection points for antenna mounts 228. The antenna mounts 228 can provide an offset for the antennas 108 in the vertical and horizontal planes.

The component base 202 can be mounted to a position adjustment chassis 230. The position adjustment chassis 230 can include a horizontal drive motor 232, horizontal drive gearing 234, a vertical drive motor 236 and vertical drive gearing 238.

The microcontroller 210 within the component base 202 can calculate the location of the beacon 112 relative to the T-cam 104 and further calculate the horizontal angle 116 and vertical angle 118 required to track the beacon 112. The microcontroller 210 can output commands to drive the horizontal drive motor 232 that can result in the horizontal angle 116 of the image sensor 204 on the component base 202 being oriented toward the beacon 112 on the horizontal plane.

The microcontroller 210 can output commands to drive the vertical drive motor 236 that can result in the vertical angle 118 of the image sensor 204 on the component base 202 being oriented toward the beacon 112 on the vertical plane. The antenna mounts 228 and the antennas 108 are depicted as mounted directly to the component base 202 resulting in the antennas 108 moving with the component base 202.

In other embodiments it is contemplated that the antenna mounts 228 and the antennas 108 could be mounted to the position adjustment chassis 230 to maintain the antennas 108 in a stationary position relative to the component base 202.

Figure 3:
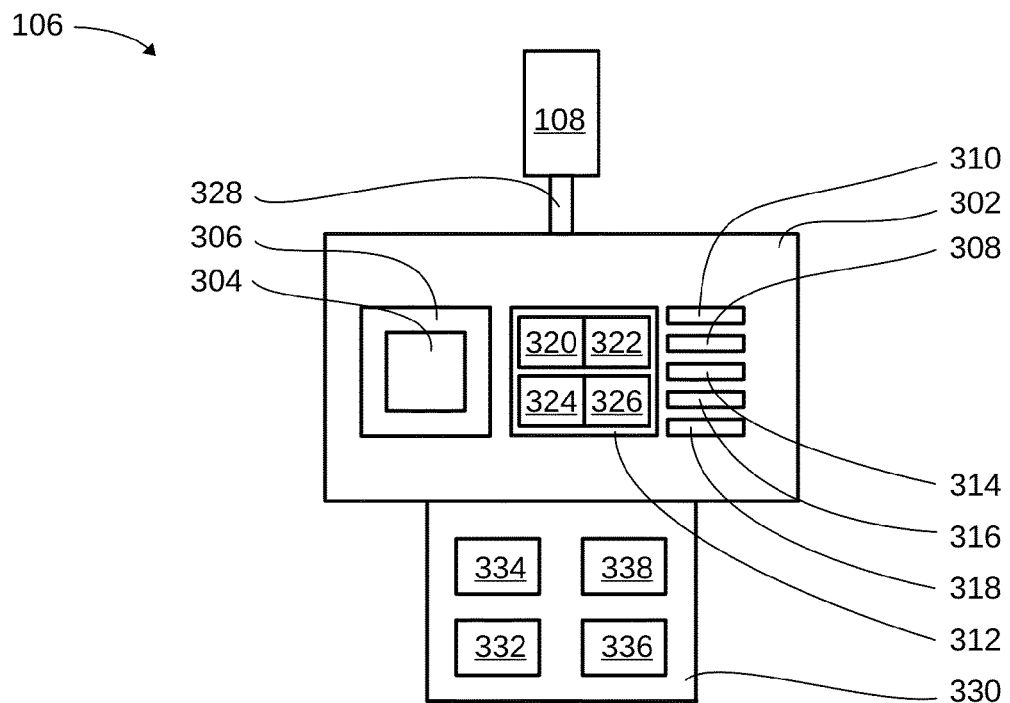
FIG. 3 is a block diagram of the 360-cam of FIG. 1.

Referring now to FIG. 3, therein is shown a block diagram of the 360-cam 106 of FIG. 1. The 360-cam 106 is shown having the antenna 108 coupled to a component base 302.

The component base 302 can function as a chassis to mount and protect an image sensor 304, optics 306, a non-transitory computer readable medium 308, a microcontroller 310, a sensor suite 312, a user interface 314, and a communications module 316. It is contemplated that the microcontroller 310 and the non-transitory computer readable medium 308 can be integrated or separate.

The optics 306 can include lenses, apertures, shutters, and mirrors for capturing an image with the image sensor 304. The optics 306 can further include zoom and focus functions driven by a zoom and focus block 318 that includes motors and gearing.

The image sensor 304 can be coupled to the non-transitory computer readable medium 308 for storing the image. The sensor suite 312 can include a magnetometer 320, a gyroscope 322, an altimeter 324, and an accelerometer 326. It is contemplated that the magnetometer 320 and gyroscope 322 can be used to determine the direction the image sensor 304 is pointing, while the accelerometer 326 can detect acceleration of the 360-cam 106.

The acceleration detection from the accelerometer 326 combined with the direction information from the magnetometer 320 and the gyroscope 322 can be combined to determine direction of travel. The altimeter 324 can be used to determine the elevation of the 360-cam 106, and as described above can be used with an altimeter reading from the beacon 112 of FIG. 1 to determine the vertical separation between the beacon 112 and the 360-cam 106 resulting in the vertical angle 118 of FIG. 1 required for the 360-cam 106 to track the beacon 112.

The communications module 316 can enable wireless communication and wired communication. It is contemplated that the communications module 316 can be used to send and receive radio frequency signals in super high frequency (SHF), UHF or UWB to determine the distance 114 of FIG. 1 from the beacon 112 and the other tracking and recording elements 102 of FIG. 1 for the image recording system 100 of FIG. 1.

The communications module 316 is further contemplated to enable communications between the 360-cam 106 and the other tracking and recording elements 102, such as sending or receiving the location of the beacon 112, sending or receiving the altitude information for the beacon 112 or the other tracking and recording elements 102, and sending or receiving adjustments to the horizontal angle 116 of FIG. 1 or the vertical angle 118.

The communications module 316 is contemplated to communicate with the beacon 112 to transfer other information such as direction, acceleration, and audio that can be received by the communications module 316, attached to the image on the non-transitory computer readable medium 308, and synchronized with the time the information was collected by the beacon 112 and the time the image was captured by the image sensor 304.

It is contemplated that the communications module 316 can further include wireless and wired data transfer to an external storage unit such as a database or personal computer. The component base 302 can further include connection points for antenna mounts 328. The antenna mounts 328 can provide an offset for the antenna 108 in the vertical planes.

The component base 302 can be mounted to a position adjustment chassis 330. The position adjustment chassis 330 can include a horizontal drive motor 332, horizontal drive gearing 334, a vertical drive motor 336 and vertical drive gearing 338.

The microcontroller 310 within the component base 302 can calculate the location of the beacon 112 relative to the 360-cam 106 and further calculate the horizontal angle 116 and vertical angle 118 required to track the beacon 112. The microcontroller 310 can output commands to drive the horizontal drive motor 332 that can result in the horizontal angle 116 of the image sensor 304 on the component base 302 being oriented toward the beacon 112 on the horizontal plane.

The microcontroller 310 can output commands to drive the vertical drive motor 336 that can result in the vertical angle 118 of the image sensor 304 on the component base 302 being oriented toward the beacon 112 on the vertical plane. The antenna mounts 328 and the antennas 108 are depicted as mounted directly to the component base 302 resulting in the antennas 108 moving with the component base 302 as the component base 302 is adjusted.

In other embodiments it is contemplated that the antenna mounts 328 and the antennas 108 could be mounted to the position adjustment chassis 330 to maintain the antennas 108 in a stationary position relative to the component base 302.

Figures 4, 5:
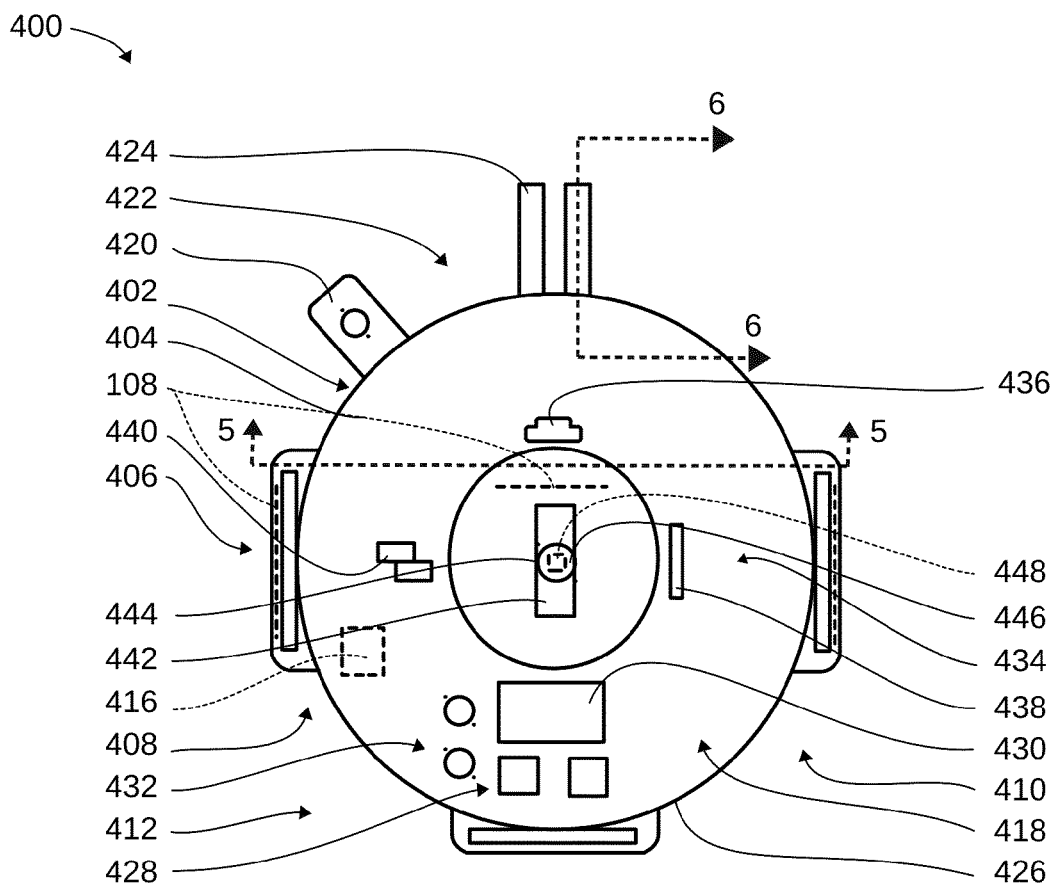
FIG. 4 is a front view of a T-cam for an alternate embodiment of the image recording system.
FIG. 5 is a cross-sectional view of the T-cam along the line 5-5 of FIG. 4.

Referring now to FIG. 4, therein is shown a front view of a T-cam 400 for an alternate embodiment of the image recording system 100. The T-cam 400 is shown having a back plate 402 coupled to a protective dome 404. Although the protective dome 404 is shown attached to the back plate 402, it is contemplated that the protective dome 404 can be optional and the T-cam 400 can be operated without the protective dome 404 especially when the underlying components will not be exposed to extreme conditions.

The back plate 402 is depicted having strap loops 406 extending out away from the back plate 402 and away from the protective dome 404. The strap loops 406 are depicted extending from a left side 408, a right side 410, and a bottom side 412 of the back plate 402. It is contemplated that the strap loops 406 can be configured in any suitable configuration depending on the specific application of the T-cam 400.

The strap loops 406 are depicted as having the antennas 108 within the strap loops 406 that connect to transceivers 416 in a component base 418 of the T-cam 400. The present embodiment has been designed with the antennas 108 in the strap loops 406 on the left side 408 and the right side 410 of the back plate 402. It is contemplated that other embodiments can implement the antennas 108 that extend beyond the strap loops 406 and that can be screwed into the T-cam 400 to extend accuracy and range when tracking the beacon 112 of FIG. 1 especially at greater distances.

The transceivers 416 can receive signals through the antennas 108, in the UHF range or the UWB range, from the communications module 716 of FIG. 7 for the beacon 112 described in greater detail below in FIGS. 7, 8, and 9. Although the present embodiment is described with regard to UHF or UWB signals, it is contemplated that other suitable frequency band could be used.

The protective dome 404 can be locked to the back plate 402 and to any object or platform with a locking loophole 420 that extends out of the back plate 402 away from the dome between a top side 422 of the back plate 402 and the left side 408 of the back plate 402. It is contemplated that the locking loophole 420 can be repositioned along the back plate 402 of the T-cam 400 for ergonomics or ease of use.

Extending from the top side 422 of the back plate 402 is a mounting bracket 424. The mounting bracket 424 can be used to attach the T-cam 400 to adjustable mounts including proprietary and industry leading mounts. The protective dome 404 is depicted flush with a perimeter 426 of the back plate 402 along the entire edge of the protective dome 404 with the exception of the portions of the back plate 402 forming the strap loops 406, the locking loophole 420, and the mounting bracket 424.

The back plate 402 can include the component base 418 that extends up away from the back plate 402 into a cavity of the protective dome 404. The component base 418 can include many of the components that provide the T-cam 400 with increased functionality.

The component base 418 can include a two-button user interface 428, a screen 430, and indicator lights 432. The two-button user interface 428 can be used by the user 110 of FIG. 1 to program or change settings within the T-cam 400 while the indicator lights 432 and the screen 430 can signal the changes have been made along with displaying status and warning messages to the user 110.

The component base 418 can further include communication ports 434 such as a mini universal serial bus (USB) slot 436 or a micro secure digital (SD) card slot 438. The communication ports 434 can be used by the T-cam 400 to both record and transfer files generated by the T-cam 400 to external systems.

The component base 418 includes a sync connector recess 440. The sync connector recess 440 is intended to be used with the beacon 112 having the sync connector 804 of FIG. 8 described in detail below in FIGS. 8 and 9. The sync connector recess 440 in combination with the sync connector 804 can be used to synchronize a clock signal between the beacon 112 and the T-cam 400 enabling highly accurate location and distance calculations between the beacon 112 and the T-cam 400.

The component base 418 further includes a camera arm recess 442 centered within the component base 418. The camera arm recess 442 can be a ½-inch deep recess allowing a camera arm 444 to be mounted therein. The camera arm 444 can include joints such as the pan joint 504 of FIG. 5 and the tilt joint 506 of FIG. 5.

Other contemplated embodiments can include a swivel joint coupled to the camera arm 444. The camera arm 444 can further include optics 446 and an image sensor 448. The optics 446 can provide focus and zoom functionality.

The camera arm recess 442 provides extra horizontal clearance for the camera arm 444 to tilt, pan, and swivel within the protective dome 404. The camera arm recess 442 helps ensure the T-cam 400 is compact while providing sufficient clearance for the camera arm 444 to include the optics 446 and the image sensor 448.

Contained within the component base 418, near and peripheral to the camera arm recess 442, is another one of the antennas 108. The antennas 108 contained within or near the strap loops 406 are closer horizontally to the back plate 402 than the antenna 108 contained within the component base 418 near the camera arm recess 442.

The horizontal coordinate of the beacon 112 can be determined by the antennas 108 and transceivers 416 using Radio Direction Finder (RDF technology). In at least one contemplated embodiment, the RDF technology implemented is 2D trilateration.

It is contemplated that the distance 114 of FIG. 1 between the T-cam 400 and the beacon 112 can be calculated from the TOF reading. That is, the length of time that the signal 120 of FIG. 1 takes to travel from the beacon 112 to the T-cam 400 can be used to calculate the distance 114 between the beacon 112 and the T-cam 400.

The signal 120 from the beacon 112 can include a time stamp, which can be used to determine the flight time of the signal 120. The horizontal angle 116 of FIG. 1 of the beacon 112 relative to the T-cam 400 can be determined in two ways.

The first method of determining the horizontal angle 116 is by using the TDOA, which can use the difference in time that the signal 120 from the beacon 112 arrives at the antennas 108 to calculate the horizontal angle 116. When the antennas 108 receive the signal 120 from the beacon 112 at different times, the beacon 112 will be closer to one of the antennas 108 and further from the other. This relative distance from the antennas 108 correlates to the horizontal angle 116.

The second method of determining the horizontal angle 116 of the beacon 112 relative to the T-cam 400 involves determining the distance 114 between the beacon 112 and each of the antennas 108 of T-cam 400 using TOF. Because the distance 114 between the antennas 108 on the T-cam 400 is also known, the horizontal angle 116 of the beacon 112 relative to the T-cam 400 can be calculated.

A third method of determining the horizontal angle 116 involves determining the distance 114 between the beacon 112 and the T-cam 400, the distance 114 between the beacon 112 and another tracking and recording element 102 of FIG. 1, and determining the distance 114 between the T-cam 400 and the second tracking and recording element 102 using TOF. Because the distance 114 between the T-cam 400 and the other tracking and recording element 102 is also known, the horizontal angle 116 of the beacon 112 relative to the T-cam 400 can be calculated.

The horizontal angle 116 can be used by the T-cam 400 to adjust the pan of the camera arm 444 using the pan joint 504 while the distance coordinate will be used by the T-cam 400 to adjust both the zoom and the focus of the T-cam 400. Optionally, the zoom and focus can be fine-tuned by a range finder such as a laser rangefinder.

It is further contemplated that the component base 418 of the T-cam 400 and the beacon 112 can each include an altimeter to provide the difference in elevation between the two, which in addition to the distance between them, can be used to calculate the vertical angle 118 of FIG. 1 required of the camera arm 444 to track the beacon 112. Along with the altimeter, the component base 418 of the T-cam 400 can include a gyroscope, accelerometer, and magnetometer that can be used to determine the orientation of the component base 418 as a starting point to calculate the vertical angle 118 or the horizontal angle 116. It is contemplated that in other embodiments where a swivel joint is also used, in addition to the pan joint 504 and the tilt joint 506, the gyroscope and accelerometer can enable the swivel joint to maintain a proper orientation of the horizon within the picture frame captured by the image sensor 448.

It is contemplated that other T-cams 400 can track the signal 120 emanating from the transceivers 416 in the beacon 112 or another T-cam 400. Providing the transceivers 416 in each T-cam 400 allows the T-cams 400 to track and record each other.

In other implementations, the T-cam 400 can track multiple beacons 112 or T-cams 400. When multiple beacons 112 are tracked, the tracking T-cam 400 can be programmed to record the closest beacon 112 to the T-cam 400 that is in front of the T-cam 400.

Referring now to FIG. 5, therein is shown a cross-sectional view of the T-cam 400 along the line 5-5 of FIG. 4. The T-cam 400 is depicted having the protective dome 404 coupled to the back plate 402.

The strap loops 406 of the back plate 402 are shown extending out beyond the edge of the protective dome 404. Within the protective dome 404, the component base 418 is shown extending from the back plate 402 into the area defined by the protective dome 404.

The component base 418 can be formed with a curve complementary to the curve of the protective dome 404 around an outer edge of the component base 418. The component base 418 slants linearly toward an apex of the protective dome 404 from the outer edge of the component base 418.

Near a center portion of the component base 418 the component base 418 includes a flat portion 502 following a vertical plane. In this flat portion 502 of the component base 418, the camera arm recess 442 of FIG. 4 can be formed.

A pan joint 504 of the camera arm 444 can be seen beyond the flat portion 502 of the component base 418. A tilt joint 506 is shown positioned along the camera arm 444 beyond the pan joint 504. Both the pan joint 504 and the tilt joint 506 can be positioned along the camera arm 444 out away from the component base 418.

It is contemplated that other embodiments can include the tilt joint 506 within the component base 418 allowing the camera arm 444 to move in the vertical direction within the camera arm recess 442. The image sensor 448 of FIG. 4 can be mounted either inside or just above the pan joint 504 when the tilt joint 506 is located within the component base 418 or above the tilt joint 506 when the tilt joint 506 is located along the camera arm 444. The optics 446, including lens, can be mounted in a distal section of the camera arm 444.

Figure 6:
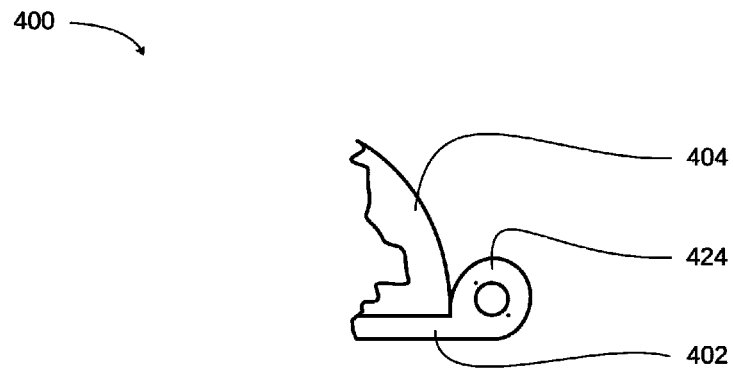
FIG. 6 is a cross-sectional view of the T-cam along the line 6-6 of FIG. 4.

Referring now to FIG. 6, therein is shown a cross-sectional view of the T-cam 400 along the line 6-6 of FIG. 4. The T-cam 400 is shown having the protective dome 404 terminating at the back plate 402.

The mounting bracket 424 is shown extending out from the back plate 402 and horizontally out and peripheral to the edge of the protective dome 404. The mounting bracket 424 can include a dual adjacent through holes intended to be compatible with industry leading mounts and provide a secure structurally rigid coupling of the T-cam 400.

Figure 7:
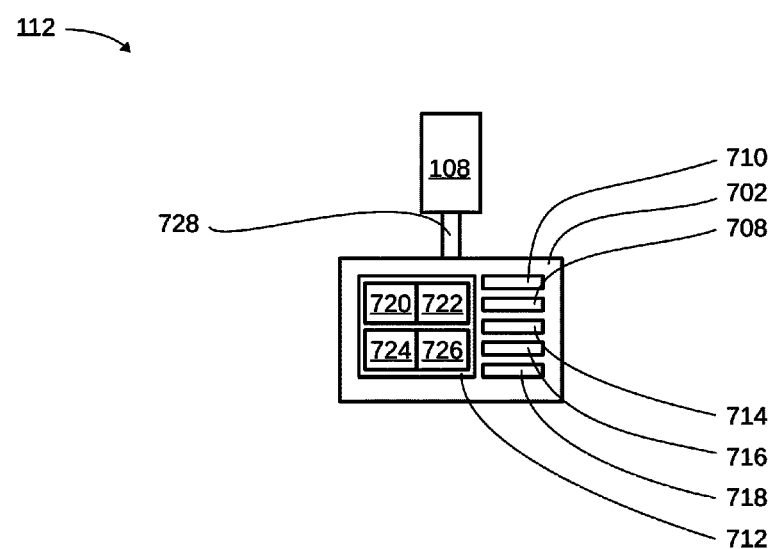
FIG. 7 is a block diagram of the beacon of FIG. 1.

Referring now to FIG. 7, therein is shown a block diagram of the beacon 112 of FIG. 1. The beacon 112 is shown having the antenna 108 coupled to a component base 702.

The component base 702 can function as a chassis to mount and protect a non-transitory computer readable medium 708, a microcontroller 710, a sensor suite 712, a user interface 714, a communications module 716, and an audio sensor 718. It is contemplated that the microcontroller 710 and the non-transitory computer readable medium 708 can be integrated or separate.

The audio sensor 718 can be a microphone for capturing sound of the user 110 of FIG. 1 or around the user 110. The audio sensor 718 can be coupled to the non-transitory computer readable medium 708 for storing the sound. The sensor suite 712 can include a magnetometer 720, a gyroscope 722, an altimeter 724, and an accelerometer 726. It is contemplated that the magnetometer 720, gyroscope 722, and accelerometer 726 can be used to determine the direction the beacon 112 is pointing and the user 110 is facing, while the accelerometer 726 can detect acceleration of the beacon 112.

The acceleration detection from the accelerometer 726 combined with the direction information from the magnetometer 720 and the gyroscope 722 can be combined to compute and predict direction of travel. The altimeter 724 can be used to determine the elevation of the beacon 112, and as described above, can be used with an altimeter reading from the tracking and recording elements 102 of FIG. 1 to determine the vertical separation between the beacon 112 and the tracking and recording elements 102 resulting in the vertical angle 118 of FIG. 1 required for the tracking and recording elements 102 to track the beacon 112.

It is further contemplated that the tracking and recording elements 102 can receive the readings from the sensor suite 712 wirelessly from the beacon 112. The accelerometer 726 readings can be used to calculate and adjust the vertical angle 118, which then could be confirmed by the readings from the altimeter 724 once the altimeter 724 readings stabilized and reflect any change in elevation.

The elevation change of the beacon 112 can be predicted by combining an acceleration detected by the accelerometer 726 with readings from the gyroscope 722 to determine orientation. The amount of vertical movement can then be determined and combined with the distance 114 of FIG. 1 from the beacon 112 to the tracking and recording elements 102 to compute the vertical angle 118 adjustment required.

It has been discovered that utilizing the readings from the accelerometer 726 and the gyroscope 722 to predict vertical motion of the beacon 112 greatly enhances the speed and responsiveness of the tracking and recording elements 102 because the altimeter 724 readings can be slower and lag behind the actual movement of the beacon 112 while the accelerometer 726 readings and the gyroscope 722 readings are much faster and can be used to adjust the tracking and recording elements 102 by the vertical angle 118 before the altimeter 724 readings are provided.

The communications module 716 can enable wireless communication and wired communication. It is contemplated that the communications module 716 can be used to send and receive radio frequency signals to determine the distance 114 from the tracking and recording elements 102 for the image recording system 100 of FIG. 1.

The communications module 716 is contemplated to communicate with the tracking and recording elements 102 to transfer other information such as direction, acceleration, and audio that can be received by tracking and recording elements 102, attached to the image taken by the tracking and recording elements 102, and synchronized with the time the information was collected by the beacon 112 and the time the image was captured by the tracking and recording elements 102.

It is contemplated that the information from the accelerometer 726, the magnetometer 720, the altimeter 724, the gyroscope 722, and the audio sensor 718 can be time-stamped by the beacon 112. The time-stamp on this information can be synchronized with the time the image was taken by the tracking and recording elements 102.

Synchronizing and time-stamping the information collected by the beacon 112 allows still pictures to be matched with the information collected by the beacon 112 when the still picture was recorded. Synchronizing and time-stamping the information collected by the beacon 112 further allows motion pictures to be matched with the information collected by the beacon 112 when the motion picture was recorded.

It is contemplated that as the motion picture is recorded over a time span, the information collected by the beacon 112 can be matched with the motion picture throughout the time span so that one motion picture recorded by the tracking and recording elements 102 can be matched with multiple pieces of information collected by the beacon 112 at different times. It is contemplated that the information collected by the beacon 112 can be matched with the images recorded by the tracking and recording elements 102 as metadata elements on the image files.

It is contemplated that the communications module 716 can further include wireless and wired data transfer to an external storage unit such as a database or personal computer. The component base 702 can further include connection points for antenna mounts 728. The antenna mounts 728 can provide an offset for the antenna 108 in the vertical planes.

Figure 8:
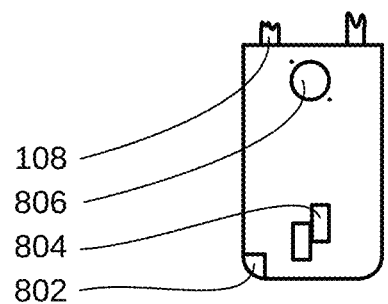
FIG. 8 is a front view of a beacon for an alternate embodiment of the image recording system.

Referring now to FIG. 8, therein is shown a front view of a beacon 800 for an alternate embodiment of the image recording system. The beacon 800 is depicted as a pendant that would be worn around the user's 110 neck of FIG. 1 rather than on a top of a helmet as is shown with the beacon 112 of FIG. 1.

The beacon 800 is depicted including a light emitting diode (LED) indicator 802 and a sync connector 804 on an outer surface of the beacon 800. The LED indicator 802 is positioned at a bottom corner of the beacon 800 and wrapping around from a front side of the beacon 800 to a portion of a bottom and side of the beacon 800.

While the LED indicator 802 is depicted as an LED it is contemplated that any suitable indicator can be used. The LED indicator 802 can indicate the programming mode of the beacon 800, the charge state of the beacon 800, user selected settings, the operational state of the beacon 800, or a combination thereof. The LED indicator 802 can further indicate the state of the beacon 800 in relation to the tracking and recording elements 102 of FIG. 1 such as whether there is a valid hand-shake or whether the beacon 800 is within range.

The sync connector 804 can be mated with the sync connector recess 440 of FIG. 4 on the T-cam 400 of FIG. 4. The mating or coupling of the sync connector 804 with the sync connector recess 440 allows the T-cam 400 to synchronize the clocks contained within the T-cam 400 with the clocks contained within the beacon 800 for highly accurate tracking.

The coupling or mating of the sync connector 804 of the beacon 800 with the sync connector recess 440 of the T-cam 400 further allows for the transmission or uploading of information to the T-cam 400 from the beacon 800. The beacon 800 can upload audio information to the T-cam 400 captured by a microphone within the beacon 800. The beacon 800 is also depicted with a one-button user interface 806. The one-button user interface 806 allows a user to program and configure the beacon 800.

The audio information from the beacon 800 can be attached to the motion picture captured by the T-cam 400 and synchronized with the time the audio information was captured by tracking the beacon 800. The beacon 800 can also upload movement data from sensors of the beacon 800. The movement data can include altitude, heading, velocity and acceleration information. The movement data can be uploaded to the T-cam 400 and can be captured by a global positioning satellite (GPS) unit, magnetometer, altimeter, accelerometer, or gyroscope, within the beacon 800. The movement data and audio can be collected throughout the time the beacon 800 is being tracked or turned on.

The movement data and audio information from the beacon 800 can be attached to the video captured by the T-cam 400 that was captured by tracking the beacon 800. The movement data and audio information can be synchronized to coordinate the time the movement data and audio information was recorded on the beacon 800 to the time the video was recorded on the T-cam 400.

The beacon 800 can further include a battery, and it is contemplated that the shape of the beacon 800 can closely follow or be dictated by the size and shape of the battery. In one contemplated embodiment, the shape of the beacon 800 is closely related to a cellphone battery.

Along an outer edge of the beacon 800, the antenna 108 can extend in a loop. It is contemplated that the antenna 108 can function as a necklace securing the beacon 800 to the user 110 of FIG. 1. The beacon 800 can transmit an altitude and time signal through the antenna 108 that can be detected by the antennas 108 on the tracking and recording elements 102.

Figure 9:
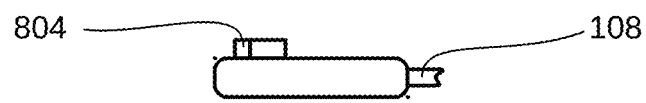
FIG. 9 is a side view of the beacon of FIG. 8.

Referring now to FIG. 9, therein is shown a side view of the beacon 800 of FIG. 8. The sync connector 804 of the beacon 800 is depicted extending out away from the body of the beacon 800. The antenna 108 is depicted extending from an edge of the beacon 800.

Figure 10:
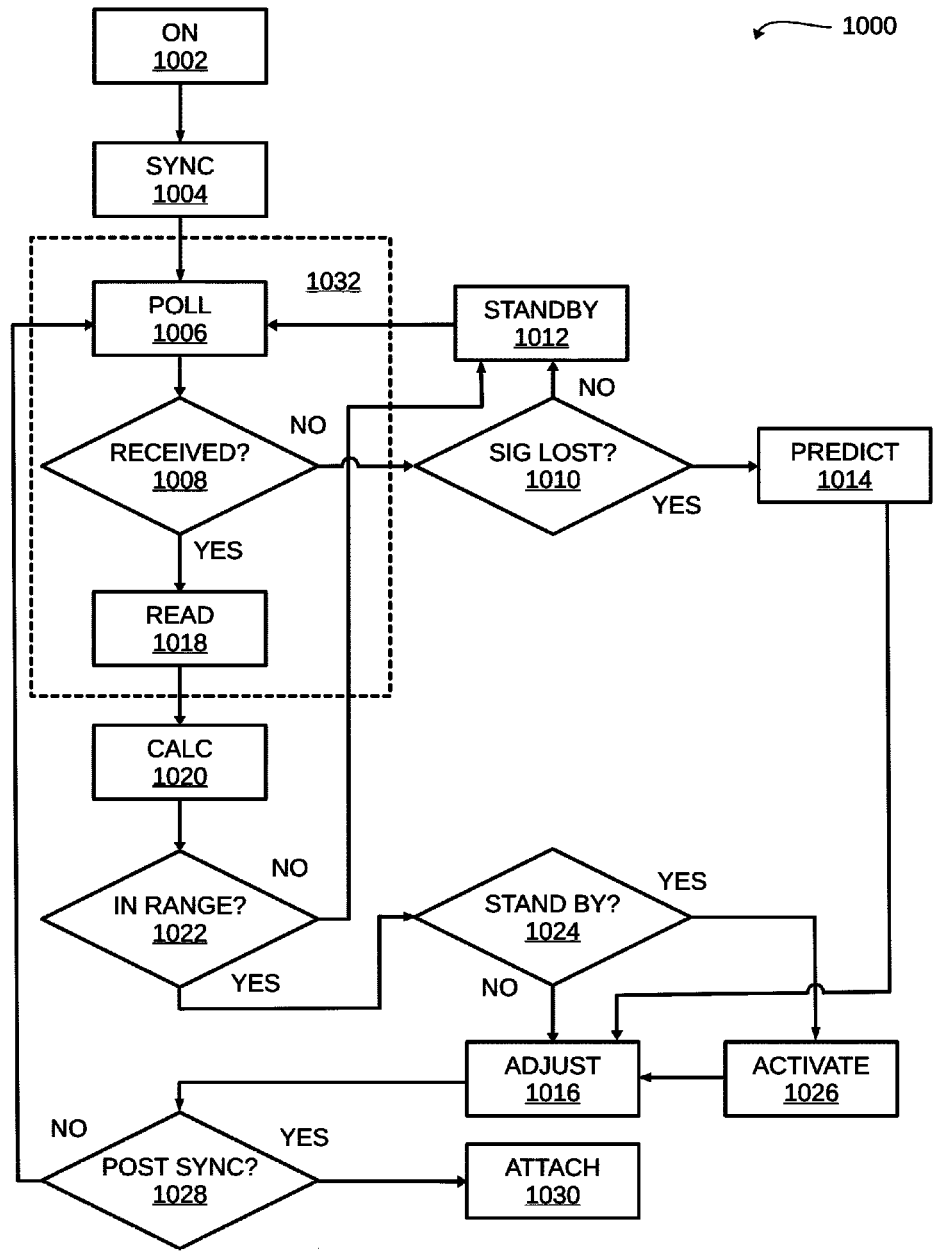
FIG. 10 is a control flow for the image recording system of FIG. 1.

Referring now to FIG. 10, therein is shown a control flow 1000 for the image recording system 100 of FIG. 1. The steps for operating the image recording system 100 can be implemented in hardware, software, firmware, or any combination thereof.

The steps, calculations, and operations can be performed on a processor such as the microcontroller 210 of FIG. 2, the microcontroller 310 of FIG. 3, the microcontroller 710 of FIG. 7 or a combination thereof. The steps, calculations, and operations can be stored in a non-transitory computer readable medium such as the non-transitory computer readable medium 208 of FIG. 2, the non-transitory computer readable medium 308 of FIG. 3, the non-transitory computer readable medium 708 of FIG. 7, or a combination thereof.

Instructions for performing the steps and operations can be contained in instructions stored on a non-transitory computer readable medium such as the non-transitory computer readable medium 208, the non-transitory computer readable medium 308, the non-transitory computer readable medium 708, or a combination thereof. Furthermore, the step boundaries commonly vary and functions can be implemented together, as well as separately in different embodiments.

The operation of the image recording system has been described with regard to one contemplated embodiment; however it is contemplated that some steps of the flow chart can be placed in different orders, combined, or removed entirely. The flow chart includes an on step 1002 that initializes the software and the hardware of the image recording system 100 of FIG. 1. The on step 1002 can also be applied to the beacon 112 of FIG. 1 because of, or independently of, the on step 1002 as applied to the tracking and recording elements 102 of FIG. 1.

Once the tracking and recording elements 102 are powered on and initialized, the tracking and recording elements 102 and the beacon 112 can be synchronized in a synchronization step 1004. It is contemplated that the tracking and recording elements 102 and the beacon 112 can be synchronized wirelessly or by inserting the sync connector 804 of the beacon 800 of FIG. 8 into the sync connector recess 440 of the T-cam 400 of FIG. 4.

Bringing the sync connector 804 in contact with the sync connector recess 440 can be used to transfer clocking information between the T-cam 400 and the beacon 800 to ensure clocks on both the T-cam 400 and the beacon 800 are synchronized.

The synchronization step 1004 can also be used to transfer identifying information between the beacon 112 and the tracking and recording elements 102. Transferring identifying information allows the tracking and recording elements 102 to identify a specific beacon 112 to the exclusion of others while recording and tracking. It is contemplated that this can be accomplished wirelessly using the communications module 216 of FIG. 2 or the communications module 316 of FIG. 3 with the communications module 716 of FIG. 7.

It is contemplated that the sync connector recess 440 and the sync connector 804 can be replaced with other suitable techniques of data transfer such as near field technology, infrared data transmission, or other wireless or wired data transmission. It is also contemplated that the tracking and recording elements 102 can be synchronized with a second tracking and recording elements 102 or to multiple beacons 112 or tracking and recording elements 102 during the synchronization step 1004.

Once the tracking and recording elements 102 and the beacon 112 have been synchronized in the synchronization step 1004, the tracking and recording elements 102 can poll the beacon 112 in a polling step 1006. The tracking and recording elements 102 can perform a wireless handshake with the beacon 112 or can passively listen for the beacon 112 to transmit information. The polling step 1006 can include a periodic activation of the communications module 216 or communications module 316, other hardware, and code within the tracking and recording elements 102 to collect the signal 120 of FIG. 1 from the beacon 112. The interval used during the polling step 1006 can save power by turning components off between polls.

A reception received decision step 1008 can be used after the polling step 1006 to determine whether the tracking and recording elements 102 have received any of the signals 120 from the beacon 112. If the tracking and recording elements 102 determine that the signal 120 was not received, a recent signal lost decision step 1010 can be initiated. The recent signal lost decision step 1010 can be initiated to determine whether the signal 120 from the beacon 112 has failed to be detected for a time greater than a preset threshold.

If the recent signal lost decision step 1010 determines that length of time between a NO determination of the reception received decision step 1008 and the last time a YES determination of the reception received decision step 1008 was made is greater than the threshold, the tracking and recording elements 102 can initiate a standby step 1012 placing the tracking and recording elements 102 into standby. If the signal 120 was recently lost, meaning, the length of time between a NO determination of the reception received decision step 1008 and the last time a YES determination of the reception received decision step 1008 was made is below a threshold, the tracking and recording elements 102 can predict the future location of the beacon 112 in a prediction step 1014.

The prediction step 1014 will be used to compare the distance 114 of FIG. 1, directions of movement, direction and acceleration information from the sensor suite 212 of FIG. 2 in the beacon 112 and positions of the beacon 112 and the tracking and recording elements 102 previously calculated over a preset timespan to estimate where the beacon 112 is likely to be in relation to the tracking and recording elements 102. Once a prediction of a location is made in the prediction step 1014, an adjustment step 1016 is invoked to adjust the tracking and recording elements 102 in the horizontal angle 116 of FIG. 1 or the vertical angle 118 of FIG. 1.

It is further contemplated that the adjustment step 1016 can be implemented to adjust a pan joint, the tilt joint, the swivel joint, the focus, and the zoom. The adjustment step 1016 can adjust the tracking and recording elements 102 based on the predicted location of the beacon 112 in relation to the tracking and recording elements 102 as determined by the prediction step 1014.

If the reception received decision step 1008 determines that the signal 120 from the beacon 112 has been received, the tracking and recording elements 102 can initiate a read step 1018. The read step 1018 can read, process, and store the signal 120 from the beacon 112.

During the read step 1018, the signal 120 transmitted from the beacon 112 can be received by the communications module 216 of the T-cam 104 of FIG. 1 or the communications module 316 of the 360-cam 106 of FIG. 1. Specifically, it is contemplated that the antennas 108 on the tracking and recording elements 102 can receive the signal 120 from the beacon 112 and process the signal 120 with the microcontroller 210 of FIG. 2 or the microcontroller 310 of FIG. 3.

During the read step 1018, concurrently, before, or after the tracking and recording elements 102 receive the signal 120 from the beacon 112, the tracking and recording elements 102 can record readings from the sensor suite 212 of FIG. 2 or the sensor suite 312 of FIG. 3. The readings can include information from a clock, the altimeter 224 of FIG. 2 or altimeter 324 of FIG. 3, the gyroscope 222 of FIG. 2 or the gyroscope 322 of FIG. 3, the magnetometer 220 of FIG. 2 or the magnetometer 320 of FIG. 3, and the accelerometer 226 of FIG. 2 or accelerometer 326 of FIG. 3.

The readings from the sensor suite 212 of the T-cam 104 or the sensor suite 312 of the 360-cam 106 can be used in conjunction with the signal 120 from the beacon 112 to calculate the location of the beacon 112 relative to the tracking and recording elements 102 in a calculation step 1020. In one contemplated embodiment, during the calculation step 1020, differences in the detection of the signal 120 between detection by the antenna 108 on the component base 418 of FIG. 4 or camera arm 444 of FIG. 4, and detection by the antennas 108 within or near the strap loops 406 of FIG. 4 can be used to calculate whether the position of the beacon 112 is in front or behind the T-cam 400.

During the read step 1018, the tracking and recording elements 102 can receive the signal 120 from the beacon 112 in the antennas 108 within or near the strap loops 406. During the calculation step 1020, differences in the detection of the signal 120 between the antennas 108 can be used to determine the horizontal angle 116 with TDOA as described above.

During the read step 1018, the tracking and recording elements 102 can also detect the time stamp of the signal 120 that corresponds to the time the beacon 112 sent the signal 120. During the calculation step 1020, the length of time the signal 120 takes to traverse between the beacon 112 and the tracking and recording elements 102 can be used to calculate the distance 114 between the beacon 112 and the tracking and recording elements 102 using TOF as described above. The distance 114 can be used to calculate the correct focus and calculate what zoom level is required for the desired framing of the user 110 wearing the beacon 112.

During the calculation step 1020, the tracking and recording elements 102 can further calculate the location of the beacon 112 relative to the tracking and recording elements 102 in a vertical plane that corresponds to the vertical angle 118 adjustment. The location of the beacon 112 relative to the tracking and recording elements 102 in the vertical plane can be calculated using the difference between the altitude sensed by the tracking and recording elements 102 and the altitude sensed by the beacon 112 or by the time difference of arrival between the signal 120 detected on an antenna 108 and a vertically offset antenna 108 of the tracking and recording element 102, as these methods are described above.

In one contemplated embodiment, the calculation step 1020 can further calculate an amount that a swivel joint should be moved to maintain a stable horizon level with respect to the image sensor 204 of FIG. 2 or the image sensor 304 of FIG. 3 as the tracking and recording elements 102 moves or rotates. The calculation step 1020 can further translate the location between the beacon 112, the tracking and recording elements 102, and the horizon into instructions or distances that the pan joint, the tilt joint, the swivel joint, the focus, and the zoom should be adjusted to continue tracking the beacon 112 and maintain a proper frame of the user wearing the beacon 112.

It is contemplated that the calculation step 1020 can compare the most recently calculated location of the beacon 112 relative to the tracking and recording elements 102 to previously calculated locations of the beacon 112 relative to the tracking and recording elements 102 and then estimate a future location of the beacon 112 relative to the tracking and recording elements 102. The estimation of future locations of the beacon 112 relative to the tracking and recording elements 102 can be used to smooth out the adjustments of the horizontal angle 116 and the vertical angle 118 for the tracking and recording elements 102.

A range decision step 1022 can be used to determine whether the beacon 112 is behind the tracking and recording elements 102, out of range of the tracking and recording elements 102, or in a location that cannot be captured by the largest adjustments to the horizontal angle 116 or the vertical angle 118 for the tracking and recording elements 102. If it is determined that the beacon 112 is not in range of any horizontal angle 116 or vertical angle 118 adjustments, the tracking and recording elements 102 can initiate the standby step 1012 and place the tracking and recording elements 102 in standby.

If the standby step 1012 is initiated, the tracking and recording elements 102 will not be adjusted for the horizontal angle 116 or vertical angle 118 and the adjustment step 1016 will be skipped. Further, it is contemplated that the position of the beacon 112 in front of or behind the tracking and recording elements 102 can be calculated from the signal 120 first and if the beacon 112 is determined to be behind the tracking and recording elements 102 or out of range as described above, no further calculations will be performed until the beacon 112 is once again determined to be in range or in front of the tracking and recording elements 102. It has been discovered that skipping adjustments and calculations when the beacon 112 is out of range saves power.

If the beacon 112 is determined to be within rage of an adjustment, the tracking and recording elements 102 could initiate a standby decision step 1024. The standby decision step 1024 can be used to determine whether the tracking and recording elements 102 are currently in a standby state. If the tracking and recording elements 102 are determined to be in a standby state, an activation step 1026 can be executed to activate the tracking and recording elements 102 and bring the tracking and recording elements 102 out of the standby state.

If, during the standby decision step 1024, it is determined that the tracking and recording elements 102 is not in the standby state, the adjustment step 1016 can be executed. The adjustment step 1016 can also be executed after the activation step 1026 if the tracking and recording elements 102 was previously in the standby state.

The adjustment step 1016 can use the calculations from the calculation step 1020 to adjust the tracking and recording elements 102 for the horizontal angle 116, the vertical angle 118, the focus, and the zoom. The adjustment step 1016 can move the tracking and recording elements 102 to track the beacon 112 and frame the user 110.

Specifically it is contemplated that the horizontal drive motor 232 of FIG. 2 along with the horizontal drive gearing 234 of FIG. 2 for the T-cam 104 can pan the T-cam 104 horizontally an amount equal to the difference between the horizontal angle 116, of the beacon 112 relative to the T-cam 104, and a current or previous direction on the horizontal plane that the image sensor 204 is facing. Similarly, it is contemplated that the horizontal drive motor 332 of FIG. 3 along with the horizontal drive gearing 334 of FIG. 3 for the 360-cam 106 can pan the 360-cam 106 horizontally an amount equal to the difference between the horizontal angle 116, of the beacon 112 relative to the 360-cam 106, and a current or previous direction on the horizontal plane that the image sensor 304 is facing.

It is further contemplated that the vertical drive motor 236 of FIG. 2 along with the vertical drive gearing 238 of FIG. 2 for the T-cam 104 can tilt the T-cam 104 vertically an amount equal to the difference between the vertical angle 118, of the beacon 112 relative to the T-cam 104, and a current or previous direction on the vertical plane that the image sensor 204 is facing. Similarly, it is contemplated that the vertical drive motor 336 of FIG. 3 along with the vertical drive gearing 338 of FIG. 3 for the 360-cam 106 can tilt the 360-cam 106 vertically an amount equal to the difference between the vertical angle 118, of the beacon 112 relative to the 360-cam 106, and a current or previous direction on the vertical plane that the image sensor 304 is facing.

It is contemplated that the tracking and recording elements 102 can utilize a laser rangefinder to further calculate and adjust the zoom and focus along in combination with or instead of the distance calculations of the calculation step 1020. It is contemplated that the laser rangefinder could be used once the tracking and recording elements 102 has adjusted for the horizontal angle 116 and the vertical angle 118 without calculating and adjusting for zoom and focus based on the signal 120 from the beacon 112.

Once the tracking and recording elements 102 has been adjusted to track the beacon 112 and frame the user 110, a post synchronization decision step 1028 can be initiated to determine whether the beacon 112 and the tracking and recording elements 102 are being post synchronized. If the beacon 112 and the tracking and recording elements 102 are being post synchronized, an attachment step 1030 is used for post synchronization. In the attachment step 1030, post synchronization is performed and takes information on the beacon 112 such as GPS velocity and acceleration of the movement data, audio information recorded, or a combination thereof and transfers them over to the tracking and recording elements 102.

It is contemplated that the attachment step 1030 could also be performed as the beacon 112 detects acceleration, direction, and audio. The attachment step 1030 can record the time of the post synchronization and can then synchronize and attach the beacon's 112 audio information and movement data to the image captured at the same time by the tracking and recording elements 102.

If post synchronization is not being performed, the tracking and recording elements 102 will execute the polling step as described above. A block 1032 is shown that can be modified if the 360-cam 106 is implemented, which is discussed below in FIG. 11.

Figure 11:
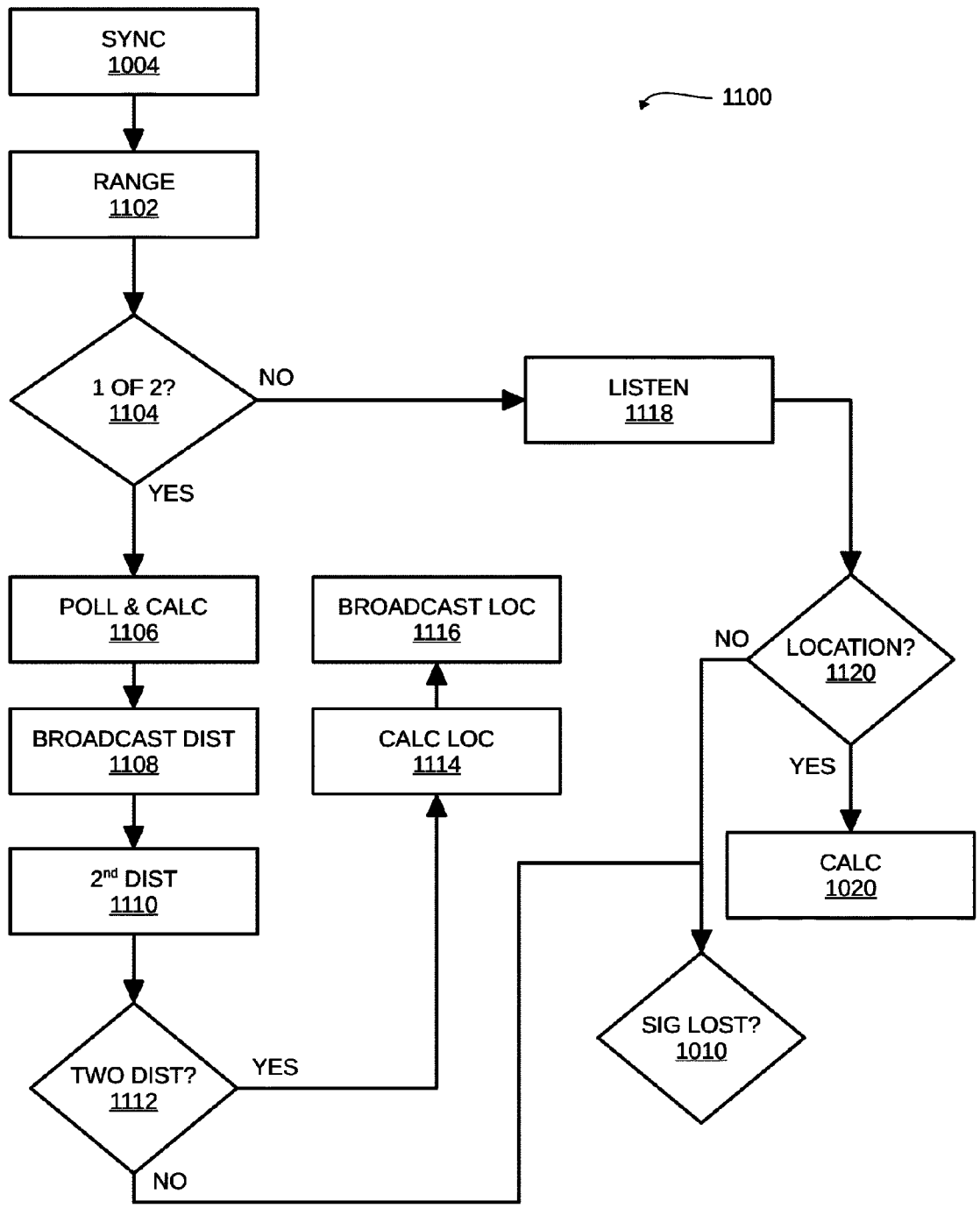
FIG. 11 is a control flow for implementing multiple tracking and recording elements of the image recording system of FIG. 1.

Referring now to FIG. 11, therein is shown a control flow 1100 for implementing multiple tracking and recording elements 102 of FIG. 1 for the image recording system 100 of FIG. 1. The control flow 1100 can replace the block 1032 of FIG. 10 when multiple tracking and recording elements 102 are implemented.

It is contemplated that when multiple tracking and recording elements 102 are implemented, the TOF ranging method can provide optimal results over the TDOA methods for the T-cam 104 of FIG. 1 acting alone. The control flow 1100 is shown first having the synchronization step 1004 from the control flow 1000 of FIG. 10 that can be coupled to the block 1032.

With the completion of the synchronization step 1004 the tracking and recording elements 102 can initiate a ranging step 1102. The ranging step 1102 can perform a ranging transaction between the tracking and recording elements 102 and determine the distance 114 of FIG. 1 between the tracking and recording elements 102.

It is contemplated that in at least one embodiment, the distance 114 between the tracking and recording elements 102 can be fixed and the ranging step 1102 will only need to be performed once after the synchronization step 1004. In other contemplated embodiments, the tracking and recording elements 102 can move and the distance 114 between the tracking and recording elements 102 can change during operation. When the distance 114 changes during operation of the tracking and recording elements 102, the ranging step 1102 can be performed each time the calculation step 1020 of FIG. 10 is performed.

The tracking and recording elements 102 can initiate a couple nearest decision step 1104 to determine whether the tracking and recording elements 102 are either the closest or second closest of the tracking and recording elements 102 to the beacon 112 of FIG. 1. If the couple nearest decision step 1104 results in a YES, meaning the tracking and recording elements 102 are either the closest or the second closest tracking and recording elements 102 to the beacon 112, the tracking and recording elements 102 will initiate a poll and calculate step 1106.

It is contemplated that in alternative embodiments, the couple nearest decision step 1104 could further ensure that the closest two tracking and recording elements 102 could actually communicate. If no communication is possible between the two closest tracking and recording elements 102, the next closest tracking and recording element 102 could satisfy the couple nearest decision step 1104.

The poll and calculate step 1106 can listen for the signal 120 of FIG. 1 from the beacon 112 and calculate the distance 114 from the tracking and recording element 102 to the beacon 112 using TOF ranging. The tracking and recording element 102 can then broadcast the distance 114 to the other tracking and recording elements 102 operating in the image recording system 100 in a broadcast step 1108.

It is contemplated that both of the tracking and recording elements 102 that are determined to be nearest the beacon 112 in the couple nearest decision step 1104 will execute the poll and calculate step 1106 and the broadcast step 1108. The two tracking and recording elements 102 nearest the beacon 112 can then execute a second distance listen step 1110.

During the second distance listen step 1110, the nearest two tracking and recording elements 102 to the beacon 112 will listen for the distance 114 broadcast from the other tracking and recording element 102 closest to the beacon 112. It is contemplated that the second distance listen step 1110 can be performed in parallel with the broadcast step 1108, or before the broadcast step 1108.

The tracking and recording elements 102 can initiate a two distance decision step 1112 after the second distance listen step 1110. The two distance decision step 1112 can determine whether the tracking and recording elements 102 have both of the distances 114 between the beacon 112 and the closest two tracking and recording elements 102.

If both of the distances 114 are not received, the two distance decision step 1112 can result in a NO and the recent signal lost decision step 1010 can be initiated. If both of the distances 114 are received, the two distance decision step 1112 can result in a YES and a calculate location step 1114 can be initiated.

The calculate location step 1114 can process the distance 114 between the beacon 112 and the closest two tracking and recording elements 102, the distance 114 between the closest two tracking and recording elements 102, and the elevation information to determine location coordinates of the beacon 112. The location coordinates of the beacon 112 determined by the calculate location step 1114 can be broadcast to other tracking and recording elements 102 that are not one of the closest two to the beacon 112 in a broadcast location coordinate step 1116.

If the couple nearest decision step 1104 results in a NO, meaning the tracking and recording elements 102 are not one of the closest two tracking and recording elements 102 to the beacon 112, the tracking and recording elements 102 will initiate a listen step 1118. During the listen step 1118, the tracking and recording elements 102 can listen for the location coordinates of the beacon 112 broadcast by the two tracking and recording elements 102 that are nearest to the beacon 112 during the broadcast location coordinate step 1116.

The tracking and recording elements 102 can initiate a location coordinate decision step 1120 after the listen step 1118. The location coordinate decision step 1120 can determine whether the tracking and recording elements 102 have received the location coordinates of the beacon 112 broadcast during the broadcast location coordinate step 1116.

If the location coordinates of the beacon 112 are not received, the location coordinate decision step 1120 can result in a NO and the recent signal lost decision step 1010 can be initiated. If the location coordinates of the beacon 112 are received, the location coordinate decision step 1120 can result in a YES and the calculation step 1020 can be initiated.

The calculation step 1020 can process the location coordinates of the beacon 112 and calculate the horizontal angle 116 of FIG. 1 and the vertical angle 118 of FIG. 1 required for each of the tracking and recording elements 102 to track the beacon 112 and frame the user 110 of FIG. 1. The calculation step 1020 can also process the location coordinates of the beacon 112 and calculate the focus and zoom required for each of the tracking and recording elements 102 to focus on and frame the user 110.

Thus, it has been discovered that the image recording system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the image recording system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A relational tracking and recording method comprising:
    transmitting a signal from a beacon;
    detecting the signal with a first antenna and with a second antenna, the first antenna coupled to a tracking and recording element;
    determining a time of flight for the signal between the beacon and the first antenna;
    calculating a distance between the beacon and the first antenna based on the time of flight;
    determining a horizontal angle of the beacon relative to the tracking and recording element based on the detection of the signal by the first antenna and the second antenna;
    determining a vertical angle of the beacon relative to the tracking and recording element;
    positioning an image sensor to face toward the beacon based on the vertical angle and based on the horizontal angle;
    focusing optics in front of the image sensor based on the distance;
    zooming the optics in front of the image sensor based on the distance; and
    recording an image with the image sensor.

2. The method of claim 1 further comprising:
    recording beacon sensor data, the beacon sensor data including audio, rotation, acceleration, direction or a combination thereof;
    transmitting the beacon sensor data to the tracking and recording element; and
    synchronizing the beacon sensor data with the image recorded by the tracking and recording element based on a time the beacon sensor data was recorded and a time the image was recorded.

3. The method of claim 1 wherein determining the horizontal angle includes:
    calculating a second distance based on a second time of flight for the signal between the beacon and the second antenna, the second antenna offset horizontally from the first antenna; and
    calculating the horizontal angle based on a third distance between the first antenna and the second antenna.

4. The method of claim 1 wherein determining the vertical angle includes detecting a time difference of arrival, a different time of flight, or a combination thereof for the signal between the first antenna and the second antenna, the second antenna coupled to the tracking and recording element and offset vertically from the first antenna.

5. The method of claim 1 wherein determining the vertical angle includes:
    detecting an acceleration of the beacon in a vertical plane;
    transmitting the acceleration to the tracking and recording element; and
    predicting a location of the beacon based on the acceleration of the beacon in the vertical plane.

6. The method of claim 1 wherein determining the vertical angle includes determining a difference in altitude between the beacon and the tracking and recording element based on beacon altimeter readings from the beacon and element altimeter readings from the tracking and recording element.

7. The method of claim 1 wherein determining the horizontal angle includes detecting a time difference of arrival for the signal between the first antenna and the second antenna, the second antenna coupled to the tracking and recording element and offset horizontally from the first antenna.

8. A non-transitory computer readable medium, useful in association with a processor, including instructions configured to:
    transmit a signal from a beacon;
    detect the signal with a first antenna and with a second antenna, the first antenna coupled to a tracking and recording element;
    determine a time of flight for the signal between the beacon and the first antenna;
    calculate a distance between the beacon and the first antenna based on the time of flight;
    determine a horizontal angle of the beacon relative to the tracking and recording element based on the detection of the signal by the first antenna and the second antenna;
    determine a vertical angle of the beacon relative to the tracking and recording element;
    position an image sensor to face toward the beacon based on the vertical angle and based on the horizontal angle;
    focus optics in front of the image sensor based on the distance;
    zoom the optics in front of the image sensor based on the distance; and
    record an image with the image sensor.

9. The computer readable medium of claim 8 further comprising instructions configured:
    record beacon sensor data, the beacon sensor data including audio, rotation, acceleration, direction or a combination thereof;
    transmit the beacon sensor data to the tracking and recording element; and
    synchronize the beacon sensor data with the image recorded by the tracking and recording element based on a time the beacon sensor data was recorded and a time the image was recorded.

10. The computer readable medium of claim 8 wherein the instructions configured to determine the horizontal angle includes instructions configured to:
    calculate a second distance based on a second time of flight for the signal between the beacon and the second antenna, the second antenna offset horizontally from the first antenna; and
    calculate the horizontal angle based on a third distance between the first antenna and the second antenna.

11. The computer readable medium of claim 8 wherein the instructions configured to determine the vertical angle includes instructions configured to detect a time difference of arrival, a different time of flight, or a combination thereof for the signal between the first antenna and the second antenna, the second antenna coupled to the tracking and recording element and offset vertically from the first antenna.

12. The computer readable medium of claim 8 wherein the instructions configured to determine the vertical angle includes instructions configured to:
detect an acceleration of the beacon in a vertical plane;
transmit the acceleration to the tracking and recording element; and
predict a location of the beacon based on the acceleration of the beacon in the vertical plane.

13. The computer readable medium of claim 8 wherein the instructions configured to determine the vertical angle includes instructions configured to determine a difference in altitude between the beacon and the tracking and recording element based on beacon altimeter readings from the beacon and element altimeter readings from the tracking and recording element.

14. The computer readable medium of claim 8 wherein the instructions configured to determine the horizontal angle includes he instructions configured to detect a time difference of arrival for the signal between the first antenna and the second antenna, the second antenna coupled to the tracking and recording element and offset horizontally from the first antenna.

15. A relational tracking and recording system comprising:
a beacon configured to transmit a signal;
a first antenna and a second antenna configured to detect the signal, the first antenna coupled to a tracking and recording element;
a microcontroller coupled to the tracking and recording element configured to determine a time of flight for the signal between the beacon and the first antenna, calculate a distance between the beacon and the first antenna based on the time of flight, determine a horizontal angle of the beacon relative to the tracking and recording element based on the detection of the signal by the first antenna and the second antenna, determine a vertical angle of the beacon relative to the tracking and recording element;
a position adjustment chassis, coupled to the tracking and recording element, configured to position an image sensor of the tracking and recording element to face toward the beacon based on the vertical angle and based on the horizontal angle;
optics, in front of the image sensor, configured to focus and zoom based on the distance; and
a computer readable medium configured to record an image with the image sensor.

16. The system of claim 15 wherein:
the beacon includes computer readable medium configured to record beacon sensor data, the beacon sensor data including audio recorded with an audio sensor, acceleration recorded with an accelerometer, direction recorded with a gyroscope and magnetometer, or a combination thereof, and the beacon includes a communications module configured to transmit the beacon sensor data to the tracking and recording element; and
the microcontroller coupled to the tracking and recording element is configured to synchronize the beacon sensor data with the image recorded by the tracking and recording element based on a time the beacon sensor data was recorded and a time the image was recorded.

17. The system of claim 15 wherein the microcontroller configured to determine the horizontal angle is configured to determine the horizontal angle from:
a second distance calculated based on a second time of flight for the signal between the beacon and the second antenna, the second antenna offset horizontally from the first antenna; and
a third distance between the first antenna and the second antenna.

18. The system of claim 15 wherein the microcontroller configured to determine the vertical angle is configured to determine the vertical angle by calculating a predicted location of the beacon based on an acceleration reading in a vertical plane from an accelerometer within the beacon.

19. The system of claim 15 wherein the microcontroller configured to determine the vertical angle includes the microcontroller configured to determine a difference in altitude between the beacon and the tracking and recording element based on a reading from a beacon altimeter within the beacon and a reading from an element altimeter within the tracking and recording element.

20. The system of claim 15 wherein the microcontroller configured to determine the horizontal angle includes the microcontroller configured to detect a time difference of arrival for the signal between the first antenna and the second antenna, the second antenna coupled to the tracking and recording element and offset horizontally from the first antenna.

* * * * *